United States Patent
Ignatova et al.

(10) Patent No.: US 11,240,068 B2
(45) Date of Patent: Feb. 1, 2022

(54) METHOD FOR DETECTING AND IDENTIFYING ITEMS OF EQUIPMENT COMMUNICATING ACCORDING TO A MODBUS PROTOCOL AND COMMUNICATION CONTROLLER FOR THE IMPLEMENTATION OF SUCH A METHOD

(71) Applicant: Schneider Electric Industries SAS, Rueil Malmaison (FR)

(72) Inventors: Vanya Ignatova, Saint Martin d'Heres (FR); Alexandre Laporte, Dijon (FR); Florent Aubert, Crolles (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 45 days.

(21) Appl. No.: 16/922,183

(22) Filed: Jul. 7, 2020

(65) Prior Publication Data
US 2021/0028960 A1 Jan. 28, 2021

(30) Foreign Application Priority Data
Jul. 23, 2019 (FR) .................................. 1908341

(51) Int. Cl.
| | | |
|---|---|---|
| *H04L 12/66* | (2006.01) | |
| *H04L 12/28* | (2006.01) | |
| *H04L 12/24* | (2006.01) | |
| *H04L 29/12* | (2006.01) | |
| *H04L 29/06* | (2006.01) | |
| *H04L 29/08* | (2006.01) | |

(52) U.S. Cl.
CPC .......... *H04L 12/66* (2013.01); *H04L 12/2834* (2013.01); *H04L 12/2881* (2013.01); *H04L 41/12* (2013.01); *H04L 61/2514* (2013.01); *H04L 69/16* (2013.01)

(58) Field of Classification Search
CPC . H04L 12/66; H04L 12/2834; H04L 12/2881; H04L 41/12; H04L 61/2514; H04L 69/16; H04L 67/12
See application file for complete search history.

(56) References Cited

U.S. PATENT DOCUMENTS

| | | | |
|---|---|---|---|
| 2009/0287803 A1 | 11/2009 | McQuillan et al. | |
| 2010/0169876 A1* | 7/2010 | Mann ....................... | G06F 8/65 717/170 |
| 2013/0198245 A1* | 8/2013 | Kagan .................... | G01D 4/004 707/812 |

FOREIGN PATENT DOCUMENTS

| | | |
|---|---|---|
| FR | 2930394 A1 | 10/2009 |
| WO | WO01/76194 | 10/2001 |
| WO | WO2013/062604 | 5/2013 |

OTHER PUBLICATIONS

Search Report and Written Opinion for French Patent Application No. 1908341 dated Mar. 13, 2020, 6 pages.
(Continued)

*Primary Examiner* — Asghar H Bilgrami
(74) *Attorney, Agent, or Firm* — Locke Lord LLP

(57) ABSTRACT

A method for detecting and identifying items of equipment communicating according to a Modbus communication protocol, connected by means of a first communication network of Ethernet type and by means of at least one second communication network, the first and the second communication network being linked by a communication gateway. A communication controller implementing such a method also is disclosed.

19 Claims, 6 Drawing Sheets

(56) References Cited

OTHER PUBLICATIONS

English Language Machine Translation of French Patent Application Publication No. FR2930394A1, published on Oct. 23, 2009, 11 pages.

* cited by examiner

| ListDevicesIP |
|---|
| 192.168.10.12 |
| 192.168.10.99 |
| 192.168.10.99 |
| 192.168.10.20 |
| 192.168.10.21 |
| 192.168.10.22 | fig. 4A

| ListDevicesIP | IP@ conflict |
|---|---|
| 192.168.10.12 | |
| 192.168.10.99 | ? |
| 192.168.10.99 | ? |
| 192.168.10.20 | |
| 192.168.10.21 | |
| 192.168.10.22 | | fig. 4B

| ListDevicesIP | IP@ conflict | ListDevicesMB | @ ModBus |
|---|---|---|---|
| 192.168.10.12 | | | not ModBus |
| 192.168.10.99 | ? | | |
| 192.168.10.99 | ? | | |
| 192.168.10.20 | | 192.168.10.20 | |
| 192.168.10.21 | | 192.168.10.21 | |
| 192.168.10.22 | | 192.168.10.22 | | fig. 4C

| ListDevicesIP | IP@ conflict | ListDevicesMB | @ ModBus | ListDevicesDM | Terminal / Gateway |
|---|---|---|---|---|---|
| 192.168.10.12 | | | not ModBus | | |
| 192.168.10.99 | ? | | | | |
| 192.168.10.99 | ? | | | | |
| 192.168.10.20 | | 192.168.10.20 | 10 | PLC | Term. |
| 192.168.10.21 | | 192.168.10.21 | 30 | EGX | Gateway |
| 192.168.10.22 | | 192.168.10.22 | 22 | Battery | Term. | fig. 4D

| ListDevicesIP | IP@ conflict | ListDevicesMB | @ ModBus | ListDevicesDM | Terminal / Gateway |
|---|---|---|---|---|---|
| 192.168.10.12 | | | not ModBus | | |
| 192.168.10.99 | ? | | | | |
| 192.168.10.99 | ? | | | | |
| 192.168.10.20 | | 192.168.10.20 | 10 | PLC | Term. |
| 192.168.10.21 | | 192.168.10.21 | 30 | EGX | Gateway |
| 192.168.10.21 | | 192.168.10.21 | 100 | MPPT | Term. |
| 192.168.10.21 | | 192.168.10.21 | 150 | unknown | |
| 192.168.10.21 | | 192.168.10.21 | 160 | Combox | Term. |
| 192.168.10.22 | | 192.168.10.22 | 22 | Battery | Term. | fig. 4E

| Ident | RegAdress | Term/gate |
|---|---|---|
| EGX | 3340 | gateway |
| PLC | 3003 | Terminal |
| INV | 6434 | Terminal |
| Combox | 2525 | Terminal |
| MPPT | 7006 | Terminal |
| Battery | 2929 | Terminal |

FIG. 5

METHOD FOR DETECTING AND IDENTIFYING ITEMS OF EQUIPMENT COMMUNICATING ACCORDING TO A MODBUS PROTOCOL AND COMMUNICATION CONTROLLER FOR THE IMPLEMENTATION OF SUCH A METHOD

TECHNICAL FIELD

The present invention relates to a method for detecting and identifying items of equipment communicating according to a Modbus communication protocol, connected by means of a first communication network of Ethernet type or by means of a second communication network, the first and the second communication network being linked by a communication gateway. The invention also relates to a communication controller implementing such a method.

The term IP (Internet Protocol) network will be used hereinafter to denote a communication network of Internet (Intranet or Extranet) type in accordance with the TCP/IP (Transport Communication Protocol/Internet Protocol) standard. Modbus is a messaging protocol that is commonly used in automation equipment architectures (http://www.modbus.org/). An IP network may convey messages in accordance with the Modbus/TCP communication protocol. Modbus/TCP is a communication protocol that makes it possible to exchange frames in accordance with the Modbus protocol for the application layer (layer 7) of the ISO (International Standards Organization) model, and to convey these Modbus frames on an Ethernet network using the ISO layers of the TCP/IP standard of the Internet.

In the remainder of the present document, the term "serial Modbus network" defines a serial Modbus link using a communication protocol that makes it possible to exchange frames in accordance with the Modbus protocol and to convey these Modbus frames on a multipoint serial link. The Modbus addresses on such a serial link are coded on one byte (0 to 255).

For example, document FR 2 930 394 A1 describes the Modbus protocol and a communication gateway between two IP networks that is capable of routing messages in accordance with the Modbus/TCP communication protocol.

BACKGROUND

Industrial monitoring/control systems consist of items of equipment that are interconnected with one another by one or more communication networks in order to provide a user with operating data and to allow commands. The evolution of inter-device communication technologies and the steady increase in the number of items of equipment able to be connected is increasing the complexity of such systems. These systems are designed by experts but, for example, when they are implemented on the ground or during use, an engineer responsible for integrating the items of equipment into the installation does not always have complete tools or the necessary skills to exhaustively validate the conformity of the system or identify the origin of a fault. In particular, connecting devices to communication networks is a simple operation in itself, but verifying that all of the devices forming part of the monitoring/control system are effectively correctly connected quickly becomes complex and tedious when the system implements a large number of items of equipment. Using a device for automatically detecting and identifying all of the connected items of equipment increases the productivity of the engineer responsible for integrating the items of equipment and significantly reduces the time necessary to detect an error in the definition of the address of an item of equipment or else the installation of one type of equipment instead of another. Lastly, such a detection and identification device is able to be implemented by personnel having a technical skills level lower than that of an expert.

Patent application US 2009/0287803 A1 describes a system and a method for automatically discovering devices in large-scale monitoring systems. This method performs interrogations in various modes, fragmentary data, data blocks, register addresses, and compares the obtained response with reference values. The interrogation mode is changed when the method does not obtain a correct response.

One drawback of this method is firstly that a discovery time may be extremely lengthy since all of the connected items of equipment are subject to a recognition attempt, and secondly the discovery time is not able to evaluated a priori, and therefore the user is not able to be informed of the time necessary to completely perform the method.

Patent application WO 2013/062604 A1 describes a system for discovering, configuring and managing items of equipment. A first communication protocol is used for a phase of discovering the items of equipment and a second communication protocol is used for a phase of identifying the items of equipment. Such a method does not make it possible to discover items of equipment connected to a second communication network downstream of a communication gateway.

SUMMARY

The present invention therefore aims to rectify these drawbacks. To this end, the present invention relates to a method implemented in a communication controller connected, by means of a first communication network of Ethernet type, to one or more first items of equipment communicating according to an IP protocol, said method being intended:

to detect and to identify the first item or items of equipment communicating according to a Modbus TCP/IP communication protocol, and to detect and identify second items of equipment connected to one another by means of at least one second communication network of serial Modbus type, said second communication network being connected to the first communication network by means of a communication gateway, said method comprising the following steps:

searching for all of the first items of equipment connected to the first communication network and communicating according to an IP protocol, searching for the first item or items of equipment communicating according to a Modbus TCP/IP communication protocol, identifying at least one communication gateway from among the first item or items of equipment, and searching for and identifying the second item or items of equipment when at least one communication gateway is identified.

Advantageously, the step of searching for all of the first items of equipment comprises a step of searching for the IP addresses of the first items of equipment having open ports.

Preferably, the step of searching for all of the first items of equipment comprises a step of formulating a first list consisting of the IP addresses of all of the first items of equipment having open ports.

Advantageously, the step of searching for all of the first items of equipment comprises a step of detecting the first items of equipment having one and the same IP address.

Preferably, the step of searching for the first item or items of equipment communicating according to the Modbus TCP/IP communication protocol comprises a step of sending a Modbus identification request on TCP port 502 addressed to each first item of equipment by way of a host number, from 1 to a predefined maximum host number, for each IP address contained in the first list.

Advantageously, the step of searching for the first item or items of equipment communicating according to the Modbus TCP/IP communication protocol listed in the first list comprises a step of detecting first items of equipment responding to the Modbus identification request and having one and the same IP address.

Advantageously, the step of searching for the first item or items of equipment communicating according to the Modbus TCP/IP communication protocol comprises a step of formulating a second list consisting of the IP addresses of the first item or items of equipment responding to the Modbus address identification request.

Preferably, a database is formed in a preliminary step, said database consisting of a first field containing an item of identification data of at least one listed item of equipment and, for each listed item of equipment, at least one second field containing at least one Modbus address of a register containing the item of identification data of said listed item of equipment.

Advantageously, a third field is associated with each item of equipment listed in the database, said third field containing a state characterizing whether the listed item of equipment is a communication gateway or a terminal item of equipment.

Advantageously, the method comprises a step of identifying the first and second items of equipment communicating according to the Modbus TCP/IP communication protocol, said identification step comprising, for each first item of equipment listed in the second list:

a step of sending a Modbus content read request successively to each of the addresses contained in the second field of the database, a step of identifying the first item of equipment as a listed model when an item of data read in the step of sending the Modbus read request corresponds to the item of identification data of a listed model, and a step of formulating a third list consisting of the identification data of the items of equipment communicating according to the Modbus TCP/IP communication protocol, said third list being associated with the IP address of said first item of equipment.

Preferably, the step of identifying the first and second items of equipment communicating according to the Modbus TCP/IP communication protocol comprises an interrogation loop in which, for each first item of equipment identified in the third list:

when said identified first item of equipment is a communication gateway, then a step of searching for and identifying all of the second items of equipment connected to the second network is performed, and when said identified first item of equipment is not a communication gateway, then the step of identifying the first items of equipment continues with a step of interrogating the following identified first item of equipment in the second list.

Advantageously, the step of searching for and identifying all of the second items of equipment connected to the second communication network by means of a communication gateway comprises:

for each Modbus address from 1 to the maximum host number, a step of sending a Modbus content read request successively to each of the addresses contained in the second field of the database, a step of identifying a second item of equipment as a listed model when the item of data read at one of the addresses contained in the second field corresponds to the item of identification data of a listed model, and a step of updating the third formulated list of items of equipment by associating an item of identification data of the identified second item of equipment with the IP address of the communication gateway.

Preferably, any first or second item of equipment communicating according to the Modbus communication protocol is identified by means of a Modbus request to read an output word.

Advantageously, any first or second item of equipment is identified as being a Modbus item of equipment if it responds to a Modbus read request with an exception code other than 0x0B.

Advantageously, any first or second item of equipment is identified as being an item of equipment not communicating according to the Modbus communication protocol when a step of sending a Modbus read request does not obtain a response within a period shorter than a predefined response timeout duration.

Advantageously, the method comprises a step of estimating a total duration to detect and identify the first and second items of equipment, said total duration being less than or equal to the product of the value of the predefined response timeout duration, the maximum host number and the number of first items of equipment listed in the second list.

The duration of the response timeout is preferably between 50 and 500 ms.

The invention also relates to a communication controller comprising:

a processing unit designed to implement the method described above, at least one storage circuit, connected to the processing unit and designed to store at least a first, a second and a third address list, and a first, a second and a third field that are organized into a database, and at least one communication interface, connected firstly to the processing unit and secondly to a first communication network of Ethernet type to which first items of equipment are connected, said communication interface being designed to execute demands to send Modbus requests on the first communication network and to receive responses sent by the first items of equipment and transmit the responses to the processing unit.

The communication controller preferably comprises a human-machine interface, connected to the processing unit, in order at least to read the first, the second and the third address list and to read and/or modify the first, the second and the third field that are stored in the database.

BRIEF DESCRIPTION OF THE DRAWINGS

The appended drawings illustrate the invention:

FIGS. 4A to 4E show the content of a plurality of lists formulated as the method is performed and containing addresses, identifiers or properties of the first and the second items of equipment, FIG. 5 shows the content of a database used to identify the items of equipment.

DETAILED DESCRIPTION OF ONE EMBODIMENT OF THE INVENTION

Figure 1:
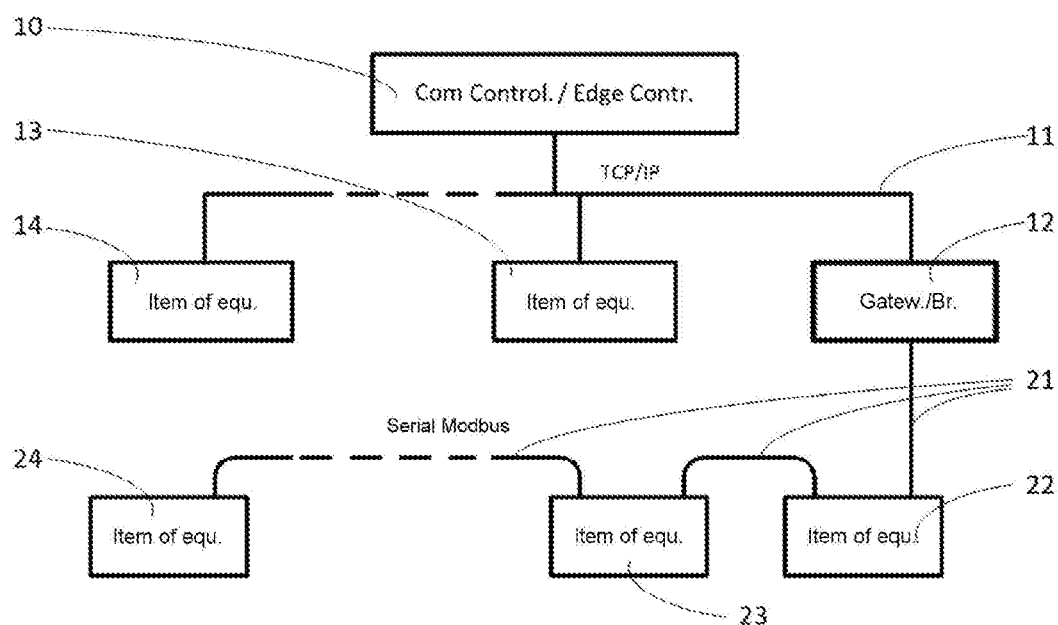
FIG. 1 is a schematic depiction of an example of a communication network comprising a communication controller.

FIG. 1 shows, in schematic form, an example of a communication network comprising a communication controller 10, also called edge controller, connected to a plurality of first items of equipment 12, 13, 14 by way of a first communication network 11 of Ethernet type. The communications between the communication controller 10 and the first items of equipment 12, 13, 14 preferably follow a TCP/IP protocol. One or more of the first items of equipment 12, 13, 14 may be a communication gateway 12. Such a communication gateway 12 is intended to allow connection of a second communication network 21 to which second items of equipment 22, 23, 24 are connected. The communication gateway 12 allows transmission of messages between the second items of equipment 22, 23, 24, the communication controller 10 and the first items of equipment 12, 13, 14.

The method forming the subject matter of the invention is particularly suitable for detecting and identifying all of the items of equipment communicating according to a Modbus protocol. The first communication network is preferably of Modbus TCP/IP type, and the second communication network is preferably of serial Modbus type.

The method forming the subject matter of the invention may be implemented in the presence of a plurality of communication gateways 12 connected to the first communication network 11 in order to connect a plurality of second networks 21. The method is executed identically whether there are one or more communication gateways and therefore one or more second communication networks. Said method may also be executed when there is not a communication gateway 12 or when it is faulty. FIG. 1 shows only one gateway and only one second network 21 in order to make the description clearer.

Figure 2:
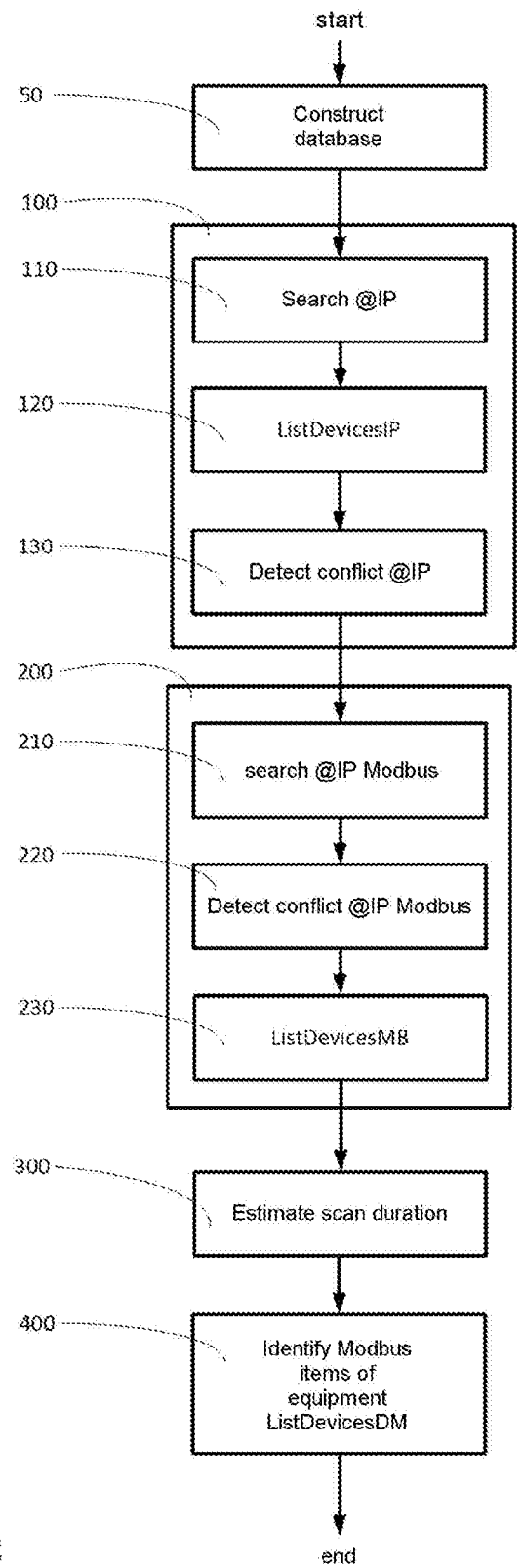
FIG. 2 shows a flowchart of a method for detecting and identifying the first and the second items of equipment.
Figure 3:
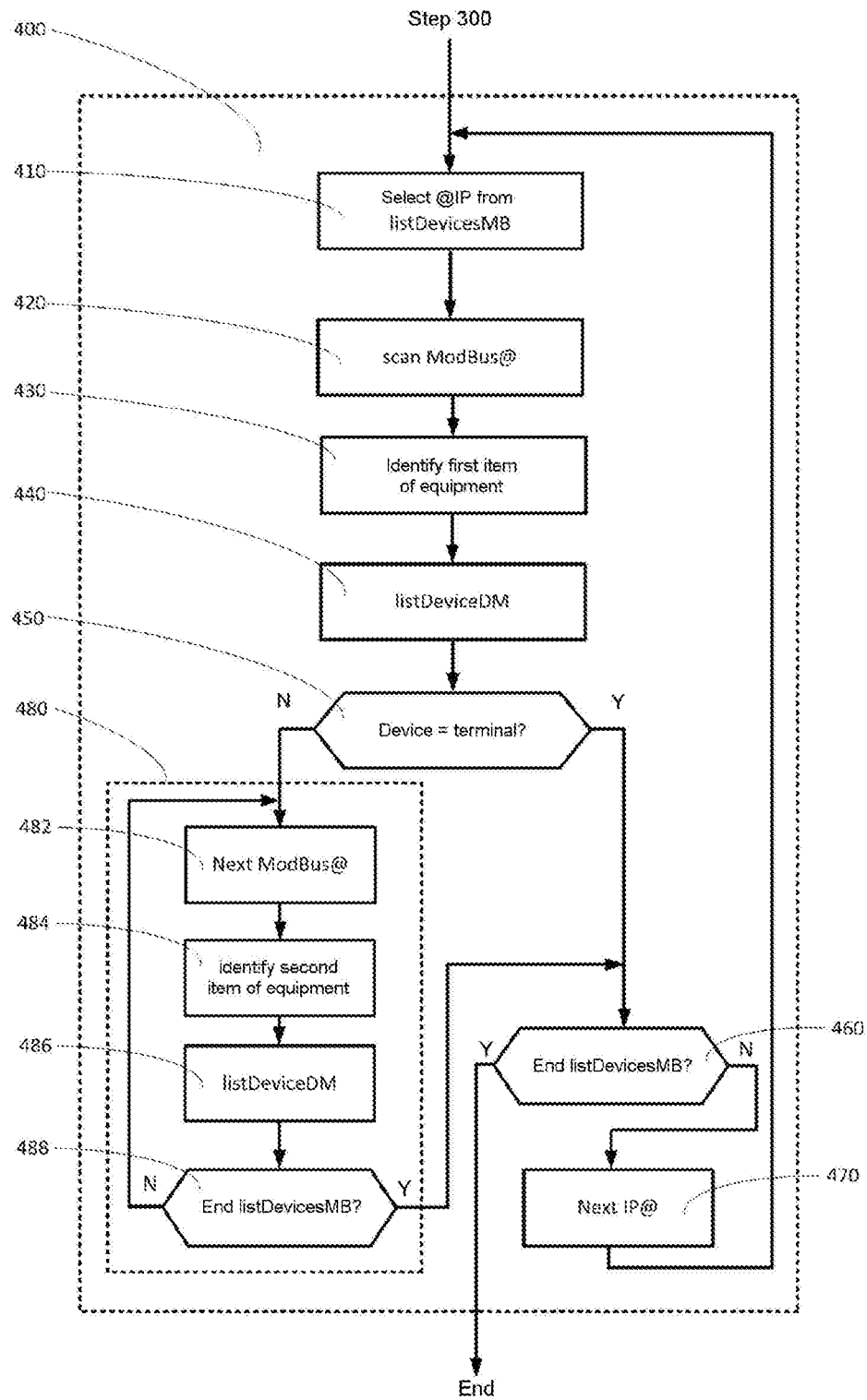
FIG. 3 shows, in detail, a step of the method forming the subject matter of the invention.
Figure 6:
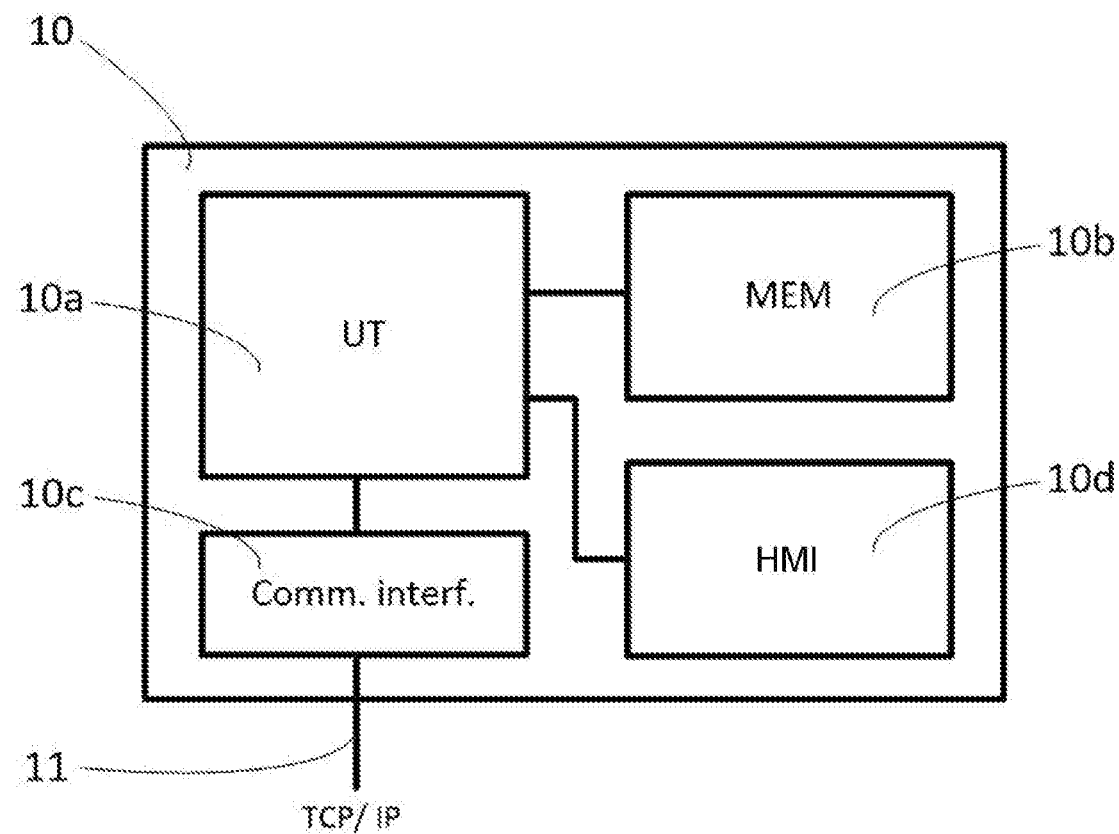
FIG. 6 shows a block diagram of a communication controller comprising means for implementing the method for detecting and identifying the first and second items of equipment.

FIG. 2 shows a flowchart of the method for detecting and identifying all of the first items of equipment and all of the second items of equipment. A search for all of the first items of equipment 12, 13, 14 connected to the first network 11 and communicating according to an Ethernet protocol is performed in a searching step 100. To this end, in a searching step 110, the communication controller 10 searches for the IP addresses of all of the items of equipment connected to the first network 11 by scanning the open ports of the connected items of equipment. A port of an item of equipment is used by the TCP (Transmission Control Protocol) protocol to set up a host-to-host connection, a host being a communicating item of equipment having an IP address. A port is considered to be "open" when an attempt to connect to the port of said item of equipment obtains a response other than an error message such as for example "connection failed". Preferably, an NMAP (Network Mapper) command is sent by the communication controller 10 and makes it possible to collect the IP addresses of the items of equipment communicating according to the TCP/IP protocol. This scanning method has the advantage of executing the search in a very short time, of the order of 10 seconds.

The set of collected IP addresses is recorded in a first list ListDevicesIP in a step 120 of formulating the first list consisting of the IP addresses of all of the detected first items of equipment 12, 13, 14. One example of the first list is illustrated in FIG. 4A. In this case, six IP addresses are recorded in a first list:

192.168.10.12
192.168.10.99
192.168.10.99
192.168.10.20
192.168.10.21
192.168.10.22

It is possible for an error to have been made when implementing the first items of equipment 12, 13, 14. For example, one and the same IP address 192.168.10.99 is assigned to two different items of equipment. Such an error may affect the operation of the first communication network. Such an error is also difficult to detect manually. It is for this reason that a step 130 of detecting first items of equipment having one and the same IP address is performed. In this step, a search for a duplicate entry present in the first list ListDevicesIP is performed, and an error indicator is assigned to each IP address featuring twice. FIG. 4B illustrates the assignment of the IP address 192.168.10.99 to two different items of equipment. These two items of equipment will thereafter no longer be interrogated and an error message may be sent in order to signal this fault to the user.

The method continues with a step 200 of searching for the first item or items of equipment 12, 13, 14 communicating according to the Modbus TCP/IP communication protocol. Said searching step 200 comprises a step 210 of sending a Modbus identification request successively to each IP address contained in the first list ListDevicesIP. Only the first items of equipment 12, 13, 14 communicating according to the Modbus TCP/IP communication protocol will respond. As an IP address of the type X.Y.Z.H consists of a network number X.Y.Z and of a host number H, a first means consists in sending a Modbus identification command for each IP address contained in the first list ListDevicesIP to each host number, from 1 to a predefined maximum number, HostMaxi, for each parity, for each communication rate, for a stop bit equal to 1 and for a stop bit equal to 0. The number HostMaxi corresponds to the maximum number of Modbus items of equipment, also called "hosts", able to be assigned to an IP address. The value of the number Hostmaxi is preferably chosen to be equal to 255 in the Modbus context, but said value may also have the value 254 or 253, with some host numbers being able to be reserved for specific Modbus requirements. This first means is exhaustive but lengthy. The Modbus identification request is preferably sent, for each IP address contained in the first list ListDevicesIP, by way of a sequence of "NMAP" commands on TCP port 502 addressed to each host number, from 1 to the maximum host number HostMaxi. Such a sequence of commands takes the form, for example and for a class C network, of:

Nmap –p 502 192.168.10.1/24
Nmap –p 502 192.168.10.2/24
. . .
Nmap –p 502 192.168.10.255/24

The time necessary to execute such a command is substantially constant, of the order of 10 seconds.

Next, a step 220 of detecting first items of equipment 12, 13, 14 having one and the same Modbus IP address is executed in order to detect this type of error.

The method continues with a step 230 of formulating a second list ListDevicesMB consisting of the IP addresses of the first item or items of equipment 12, 13, 14 responding to the Modbus IP address identification request without an error. One example of the second list is illustrated in FIG. 4C: this second list consists of the IP addresses of the first items of equipment communicating according to the Modbus TCP/IP communication protocol. This second list ListDevicesMB is a subset of the first list ListDevicesIP. The elements that are present in the first list but not present in the second list are the first items of equipment not communicating according to the Modbus TCP/IP protocol, for example a printer, and the items of equipment whose IP address is assigned to a plurality of items of equipment.

The method continues with a step 300 of estimating a total duration T to detect and identify the first and second items of equipment. The total duration T corresponds to a maximum duration, assuming that all of the first and second items of equipment are communication gateways. Said duration T is equal to or less than the product of the number NbrModbusDevices of first items of equipment 12, 13, 14 listed in the second list ListDevicesMB, the number HostMaxi corresponding to the maximum number of Modbus items of equipment able to be assigned to an IP address and the value of a predefined response timeout duration Tr:

$$T \leq NbrModbusDevices \times HostMaxi \times Tr$$

The duration of the response timeout Tr is preferably between 50 ms and 500 ms. In the case of a response timeout duration Tr equal to 200 ms and for three Modbus items of equipment connected correctly to the first communication network as illustrated in FIG. 4C, the total detection and identification duration T will be less than or equal to:

$$T \leq NbrModbusDevices \times HostMaxi \times Tr$$

That is to say: $T \leq 3 \times 255 \times 0.2$
That is to say: $T \leq 153$ seconds.

The step 300 of estimating the total duration T to detect and identify the first and second items of equipment is useful for informing a user of the time necessary to execute the method. As said estimation step 300 is purely informative, executing it is optional in the execution of the method for detecting and identifying the items of equipment.

A preliminary step 50 is executed before executing the step 100 of searching for all of the first items of equipment 12, 13, 14 in order to prepare a step 400 of identifying all of the first and second items of equipment communicating according to the Modbus communication protocol. A database DataModel is formed in the preliminary step 50. Said database DataModel, the content of which is shown in FIG. 5, consists of a first field ident containing an item of identification data of at least one listed item of equipment. For example, and as shown in FIG. 5, a first row of the first field contains the item of data "EGX" corresponding to the identity of a communication gateway. A second row of the first field contains the item of data "PLC" corresponding to a programmable logic controller, and so on. All of the identifiers of the known items of equipment from one or more manufacturers may thus be listed and stored in the database DataModel. At least one second field RegAdress is assigned to each listed item of equipment. The second field RegAdress contains a Modbus address of a register containing at least the item of identification data of said listed item of equipment. For example, and as shown in FIG. 5, the Modbus address 3340 contains an item of identification data, for example "EGX", of a communication gateway "EGX". A Modbus address 3003 contains an item of identification data, for example "PLC", of a programmable logic controller "PLC". Interrogating the Modbus addresses listed in the second field RegAdress of the database DataModel thus makes it possible to identify an item of equipment. For example, and as shown in FIG. 5, when a Modbus interrogation at the address 6434 of an item of equipment obtains a response "INV", then it is possible to deduce therefrom that said interrogated item of equipment is a voltage converter (or inverter), since the response to the interrogation is equal to the content of the third row of the first field ident containing the item of data "INV" and that the address of the interrogated register corresponds to the item of data "6434" at the third row of the second field RegAdress.

Advantageously, a third field Term/gate is associated with each item of equipment listed in the database DataModel in order to characterize whether the listed item of equipment is a communication gateway 12 or a terminal item of equipment 13, 14. For example, and as shown in FIG. 5, the first row of the third field Term/gate contains the item of data "gateway" because the first row of the first field ident corresponds to an item of equipment listed under the name "EGX", which is a communication gateway. By contrast, a programmable logic controller "PLC", listed in the second row in the database DataModel, contains an item of data "Term" in the third field Term/gate, since a programmable logic controller is a terminal item of equipment and not a communication gateway.

When all of the first items of equipment 12, 13, 14 communicating according to a Modbus TCP/IP communication protocol have been listed in the second list ListDevicesMB, the method continues with a step 400 of identifying all of the first items of equipment communicating according to the Modbus TCP/IP communication protocol and, when a first item of equipment is a communication gateway, the method comprises a step of identifying all of the second items of equipment connected to said gateway. To this end, the method selects an IP address from the second list ListDevicesMB in a selection step 410. Next, in a step 420, a Modbus request to read the content is made successively to each of the addresses contained in the second field RegAdress of the database DataModel, at the selected IP address. Taking the database shown in FIG. 5 as an example, a Modbus read request will be sent to the Modbus addresses 3340 and then 3003 and then 6434, etc. An identification step 430 is then performed, in which, when an item of data read in step 420 of sending a Modbus read request corresponds to an item of identification data ident of a model listed in the database DataModel, the interrogated item of equipment is identified, a step 440 is performed in order to formulate a third list ListDeviceDM of the items of equipment communicating according to the Modbus TCP/IP communication protocol. The third list ListDeviceDM is associated with the IP address of the first items of equipment 12, 13, 14 listed in the second list ListDevicesMB. One example of the third list is illustrated in FIG. 4D, consisting of the identification data of the identified first items of equipment. The Modbus address of the first items of equipment that have been identified may be written to an additional list @Modbus, associated with the second and third lists, and illustrated by way of example in FIG. 4D.

The identified first items of equipment 12, 13, 14 may be either terminal items of equipment such as logic controllers, converters, batteries, etc. or communication gateways. A communication gateway 12 allows data to be exchanged between a communication controller 10 and second items of equipment 22, 23, 24 connected to a second communication network, the second items of equipment generally having communication functions of a level less sophisticated than that of the first items of equipment. The method forming the subject matter of the invention also makes it possible to identify the second items of equipment connected to the second network 21. To this end, step 400 of identifying the first items of equipment 12, 13, 14 comprises an interrogation loop in which, for each first item of equipment identified in the third list ListDeviceDM:

when said identified first item of equipment is a communication gateway 12, then a step 480 of searching for and identifying all of the second items of equipment 22, 23, 24 connected to the second network is performed, and when said identified first item of equipment is not a communication gateway 12 and therefore a terminal item of equipment, then the step of identifying the first items of equipment 12, 13, 14 continues with a step 470 of interrogating the following identified first item of equipment in the second list ListDevicesMB.

More precisely, when a first item of equipment is identified, a search in the third field Term/gate of the database DataModel is performed in a step 450. When the identified item of equipment is a terminal item of equipment, the method verifies, in a step 460, whether all of the first items of equipment featuring in the second list ListDevicesMB have been identified. When this is the case, the method is ended, the second list ListDevicesMB and the third list ListDeviceDM are complete and are able to be used, for example by an engineer responsible for integrating the items of equipment into the installation. Otherwise, the following IP address is selected from the second list ListDevicesMB and the method returns to step 410 of selecting an IP address to be identified.

When the identified item of equipment is a communication gateway 12, there may be a plurality of Modbus addresses assigned to a given IP address, each second item of equipment connected to the second communication network having a specific Modbus address. In this case, the method executes a step 480 of searching for and identifying all of the second items of equipment 22, 23, 24 comprising:

for each Modbus address from 1 to the maximum host number HostMaxi, a step 482 of sending a Modbus request to read the data contained at each of the addresses featuring in the second field RegAdress of the database, a step 484 of identifying a second item of equipment as a listed model when the item of data read in the previous step corresponds to the item of identification data ident of a listed model, and a step 486 of updating the third list ListDeviceDM by associating the item of identification data of the identified second item of equipment 22, 23, 24 with the IP address of the communication gateway 12.

For greater clarity, in the identification step 484, the method successively interrogates each address contained in the second field RegAdress for as long as an item of equipment does not respond with an identifier corresponding to the identifier ident associated with the interrogated Modbus address. The set of first items of equipment and second items of equipment is thereby identified. FIG. 4E illustrates, by way of example, the third list ListDeviceDM formulated at the end of step 480 of searching for and identifying all of the second items of equipment.

When a plurality of communication gateways 12 are connected to the first communication network, step 480 of searching for and identifying all of the second items of equipment 22, 23, 24 is executed successively for each of the communication gateways 12. When there is no communication gateway 12, step 480 of searching for and identifying all of the second items of equipment 22, 23, 24 is not executed as there are only first terminal items of equipment.

A Modbus identification request as made in step 420 preferably consists in sending a demand to read an output word contained in a register, also called "read-only request", in accordance with the Modbus 03 function code, to an address specified in the command, the command being sent to the unidentified item of equipment. Any other read command, for example read n bits, may also be used. When the item of equipment communicates according to a Modbus communication protocol, said item of equipment responds by sending the content of the register addressed by the command. It may be the case that the item of equipment responds with an exception code 0x01 or 0x02 or 0x03 or 0x04 or even 0x08. In these cases, the item of equipment signals that it has effectively received the command but that it is incapable of processing the demand. This information is nevertheless useful: the item of equipment that is interrogated is an item of equipment communicating according to the Modbus protocol, but its identity is unknown. The third list ListDeviceDM may still be updated, for example and as shown in FIG. 4E, by assigning an unknown identity to an item of equipment having an IP address 192.168.10.21 and a Modbus address 150. More generally, any first or second item of equipment is identified as being a Modbus item of equipment if it responds to a Modbus read request with an exception code other than 0x0B. A response with a code 0x0B means that there is no item of equipment at the interrogated address. In the same way, any first or second item of equipment is identified as being an item of equipment not communicating according to the Modbus communication protocol when a step of sending a Modbus read request does not obtain a response within a period shorter than the predefined response timeout duration Tr.

Another subject of the invention is a communication controller 10 comprising:

a processing unit 10a designed to implement the method, at least one storage circuit 10b, connected to the processing unit 10a and designed to store at least the first, the second and the third address list ListDeviceIP, ListDeviceMB, ListDeviceDM and the content of a first, a second and a third field ident, RegAdress, Term/gate that are organized into a database DataModel, and at least one communication interface 10c, connected firstly to the processing unit 10a and secondly to a first communication network 11 of Ethernet type to which first items of equipment 12, 13, 14 are connected, said communication interface 10c being designed to execute demands to send Modbus requests on the first communication network 11 and to receive responses sent by the first items of equipment 12, 13, 14 and transmit the responses to the processing unit 10a.

The communication controller 10 preferably comprises a microcomputer. In one preferred embodiment, the communication controller 10 comprises a human-machine interface 10d connected to the processing unit. Thus, an operator is able at least to read the first, the second and the third address list ListDeviceIP, ListDeviceMB, ListDeviceDM and to read and/or modify the first, the second and the third field ident, RegAdress, Term/gate that are stored in the database DataModel. Knowing this information makes it possible, in the installation or validation phase, to quickly, exhaustively and automatically verify the conformity of the configuration of the items of equipment and of the communication networks with respect to the intended communication network. The database DataModel may be updated in order to integrate new items of equipment.

The method forming the subject matter of the invention makes it possible to automatically search for and identify all of the items of equipment communicating according to the Modbus protocol, connected to the first Ethernet network and to one or more second serial Modbus networks. In addition, connected items of equipment that do not respond to the Modbus protocol are also detected. The effectiveness of the method makes it possible to significantly reduce the duration necessary in the searching and identification phase and to detect anomalies in the items of equipment, such as for example identical addresses of items of equipment connected either to the first network or to the second network, thereby offering a significant gain in productivity for the engineer responsible for integrating the items of equipment into the installation, most particularly into installations comprising a large number of connected items of equipment.

The invention claimed is:

1. Method A method implemented in a communication controller connected, by means of a first communication network of Ethernet type, to one or more first items of equipment communicating according to an IP protocol, said method being intended:
   to detect and to identify the first item or items of equipment communicating according to a Modbus TCP/IP communication protocol, and
   to detect and identify second items of equipment connected to one another by means of at least one second communication network of serial Modbus type, said second communication network being connected to the first communication network by means of a communication gateway,
said method comprising:
   searching for all of the first items of equipment connected to the first communication network and communicating according to an IP protocol,
   searching for the first item or items of equipment communicating according to a Modbus TCP/IP communication protocol,
   identifying at least one communication gateway from among the first item or items of equipment, and
   searching for and identifying the second item or items of equipment when at least one communication gateway is identified.

2. The method according to claim 1, wherein searching for all of the first items of equipment comprises searching for the IP addresses of the first items of equipment having open ports.

3. The method according to claim 2, wherein searching for all of the first items of equipment comprises formulating a first list comprising the IP addresses of all of the first items of equipment having open ports.

4. The method according to claim 3, wherein searching for all of the first items of equipment comprises detecting first items of equipment having one and the same IP address.

5. The method according to claim 4, wherein searching for the first item or items of equipment communicating according to the Modbus TCP/IP communication protocol comprises sending a Modbus identification request on a TCP port addressed to each first item of equipment by way of a host number, from 1 to a predefined maximum host number, for each IP address contained in the first list.

6. The method according to claim 5, wherein searching for the first item or items of equipment communicating according to the Modbus TCP/IP communication protocol listed in the first list comprises detecting first items of equipment responding to the Modbus identification request and having one and the same IP address.

7. The method according to claim 5, wherein searching for the first item or items of equipment communicating according to the Modbus TCP/IP communication protocol comprises formulating a second list comprising the IP addresses of the first item or items of equipment responding to the Modbus address identification request.

8. The method according to claim 7, wherein a database is formed in a preliminary step, said database comprising a first field containing an item of identification data of at least one listed item of equipment and, for each listed item of equipment, at least one second field containing at least one Modbus address of a register containing the item of identification data of said listed item of equipment.

9. The method according to claim 8, wherein a third field is associated with each item of equipment listed in the database, said third field containing a state characterizing whether the listed item of equipment is a communication gateway or a terminal item of equipment.

10. The method according to claim 9, further comprising identifying the first and second items of equipment communicating according to the Modbus TCP/IP communication protocol, said identifying comprising, for each first item of equipment listed in the second list:
    sending a Modbus content read request successively to each of the addresses contained in the second field of the database,
    identifying the first item of equipment as a listed model when an item of data read in the step of sending the Modbus read request corresponds to the item of identification data of a listed model, and
    formulating a third list comprising the identification data of the items of equipment communicating according to the Modbus TCP/IP communication protocol, said third list being associated with the IP address of said first item of equipment.

11. The method according to claim 10, wherein identifying the first and second items of equipment communicating according to the Modbus TCP/IP communication protocol comprises an interrogation loop in which, for each first item of equipment identified in the third list:
    when said identified first item of equipment is a communication gateway, then searching for and identifying all of the second items of equipment connected to the second network is performed, and
    when said identified first item of equipment is not a communication gateway, then identifying the first items of equipment continues with interrogating the following identified first item of equipment in the second list.

12. The method according to claim 11, wherein searching for and identifying all of the second items of equipment connected to the second communication network by means of a communication gateway comprises:
    for each Modbus address from 1 to the maximum host number, sending a Modbus content read request successively to each of the addresses contained in the second field of the database,
    identifying a second item of equipment as a listed model when the item of data read at one of the addresses contained in the second field corresponds to the item of identification data of a listed model, and updating the formulated third list of items of equipment by associating an item of identification data of the identified second item of equipment with the IP address of the communication gateway.

13. The method according to claim 12, wherein any first or second item of equipment communicating according to the Modbus communication protocol is identified by means of a Modbus request to read an output word.

14. The method according to claim 13, wherein any first or second item of equipment is identified as being a Modbus item of equipment if it responds to a Modbus read request with an exception code other than 0x0B.

15. The method according to claim 14, wherein any first or second item of equipment is identified as being an item of equipment not communicating according to the Modbus communication protocol when sending a Modbus read request does not obtain a response within a period shorter than a predefined response timeout duration.

16. The method according to claim 15, further comprising estimating a total duration to detect and identify the first and second items of equipment, said total duration being less than or equal to the product of the value of the predefined response timeout duration, the maximum host number and the number of first items of equipment listed in the second list.

17. The method according to claim 16, wherein the duration of the response timeout is between 50 and 500 ms.

18. A communication controller, comprising:
a processing unit configured to implement the method according to claim 1,
at least one storage circuit, connected to the processing unit and configured to store at least a first, a second and a third address list and a first, a second and a third field that are organized into a database, and
at least one communication interface, connected firstly to the processing unit and secondly to a first communication network of Ethernet type to which first items of equipment are connected, said communication interface being configured to execute demands to send Modbus requests on the first communication network and to receive responses sent by the first items of equipment and transmit the responses to the processing unit.

19. The communication controller according to claim 18, further comprising a human-machine interface, connected to the processing unit, in order at least to read the first, the second and the third address list and to read and/or modify the first, the second and the third field that are stored in the database.

* * * * *